(12) United States Patent
Petrovic

(10) Patent No.: US 9,810,170 B2
(45) Date of Patent: Nov. 7, 2017

(54) MASS FLOW RATE DETERMINATION

(71) Applicant: Ford Global Technologies, LLC, Dearborn, MI (US)

(72) Inventor: Simon Petrovic, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 14/639,722

(22) Filed: Mar. 5, 2015

(65) Prior Publication Data

US 2015/0275805 A1    Oct. 1, 2015

(30) Foreign Application Priority Data

Mar. 26, 2014  (DE) ........................ 10 2014 205 578

(51) Int. Cl.
| | | |
|---|---|---|
| *F02D 41/18* | (2006.01) | |
| *F02D 41/00* | (2006.01) | |
| *G01F 1/34* | (2006.01) | |
| *G01F 1/86* | (2006.01) | |
| *G01F 1/88* | (2006.01) | |

(52) U.S. Cl.
CPC ......... *F02D 41/18* (2013.01); *F02D 41/0007* (2013.01); *G01F 1/34* (2013.01); *G01F 1/86* (2013.01); *G01F 1/88* (2013.01); *F02D 2200/0406* (2013.01); *F02D 2200/101* (2013.01); *F02D 2200/1002* (2013.01); *Y02T 10/144* (2013.01)

(58) Field of Classification Search
CPC ................. F02D 41/18; F02D 41/0007; F02D 2200/0406; F02D 2200/1002; F02D 2200/101
USPC ........................................ 701/102; 73/114.48
See application file for complete search history.

(56) References Cited

U.S. PATENT DOCUMENTS

| | | | |
|---|---|---|---|
| 6,298,718 B1 | 10/2001 | Wang | |
| 2013/0080025 A1* | 3/2013 | Chi | F02D 28/00 701/102 |

FOREIGN PATENT DOCUMENTS

| | | |
|---|---|---|
| DE | 102007058603 A1 | 12/2007 |
| DE | 102007030233 A1 | 1/2009 |
| WO | 2011153486 A1 | 12/2011 |

OTHER PUBLICATIONS

Petrovic, S. "Method and Device for Determining a Charge Air Mass Flow Rate," U.S. Appl. No. 14/607,841, filed Jan. 28, 2015, 26 pages.

* cited by examiner

*Primary Examiner* — Mahmoud Gimie
(74) *Attorney, Agent, or Firm* — Julia Voutyras; McCoy Russell LLP

(57) ABSTRACT

Various systems and methods are provided for a mass flow rate sensor. In one example, a mass flow rate sensor comprises a first signal input, a second signal input, an output for a mass flow rate signal, a first characteristic field, a second characteristic field, each of the first and second characteristic fields associating a mass flow rate value with a pair of values of a revolution rate value and an output pressure value, and a selection unit that comprises a first parameter input and a second parameter input, the selection unit configured to produce a selection signal depending on a pair of parameters respectively received via the first and second parameter inputs and to switch the mass flow rate value of either the first or the second characteristic field through to the output of the mass flow rate sensor depending on the selection signal.

15 Claims, 5 Drawing Sheets

MASS FLOW RATE DETERMINATION

CROSS REFERENCE TO RELATED APPLICATIONS

The present application claims priority to German Patent Application No. 102014205578.4, filed Mar. 26, 2014, the entire contents of which are hereby incorporated by reference for all purposes.

FIELD

The field of the disclosure relates to determining inlet air mass flow rate in an internal combustion engine.

BACKGROUND AND SUMMARY

To increase their performance, internal combustion engines are often equipped with inlet air compressors, which compress combustion air for the internal combustion engine so that a greater mass flow rate can be achieved in the same cylinder capacity. The inlet air compressor can be driven by the internal combustion engine or may be mechanically coupled to an exhaust gas turbine disposed in the exhaust gas flow of the internal combustion engine. In the latter case, the compressor forms part of what may be referred to as an exhaust gas turbocharger.

In the process of controlling the internal combustion engine, the mass flow rate of inlet air may be adapted to current operating conditions. The mass flow rate can, for example, be adjusted depending on the current engine power demand by adjusting the revolution rate, or, for variable geometry turbochargers, the geometry of the compressor impeller. As such, knowledge of the current mass flow rate may be desired.

U.S. Pat. No. 6,298,718 describes systems and methods for detecting abnormal operation of a turbocharger compressor. In one example, a series of rationality tests are conducted on data obtained from a plurality of sensors including a mass air flow sensor disposed at the outlet of the turbocharger compressor. A rationality test specific to the mass air flow sensor, which along with a boost pressure sensor may be used to determine the condition of ambient air provided to an engine, may be performed to test the rationality of the mass air flow sensor.

The inventors herein have recognized an issue with the approach identified above. Mass air flow sensors can be expensive and are prone to degradation, which can lead to degraded engine operation. Moreover, such potential degradation motivates performance of the mass air flow sensor rationality test, which consumes energy and increases engine control complexity.

One approach that at least partially addresses the above issues includes a mass flow rate sensor configured to determine a mass flow rate of an inlet air compressor of an internal combustion engine, the mass flow rate sensor comprising a first signal input for a revolution rate signal of the inlet air compressor, a second signal input for an output pressure signal of the inlet air compressor, an output for a mass flow rate signal, a first characteristic field, a second characteristic field, each of the first and second characteristic fields associating a mass flow rate value with a pair of values of a revolution rate value and an output pressure value respectively received via the first and the second signal inputs, and a selection unit that comprises a first parameter input and a second parameter input, the selection unit configured to produce a selection signal depending on a pair of parameters respectively received via the first and second parameter inputs and to switch the mass flow rate value of either the first or the second characteristic field through to the output of the mass flow rate sensor depending on the selection signal.

In a more specific example, the first parameter input of the selection unit is connected to a revolution rate signal of the internal combustion engine and wherein the second parameter input of the selection unit is connected to a torque signal of the internal combustion engine.

In another example, the first and the second parameter inputs of the selection unit are respectively connected to the first and the second signal inputs of the mass flow rate sensor.

In this way, the mass flow rate of an inlet air compressor may be accurately inferred without the cost, complexity, packaging space, and potential degradability of a physical, dedicated mass flow rate sensor. Thus, the technical effect is achieved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

DETAILED DESCRIPTION

Figure 1:
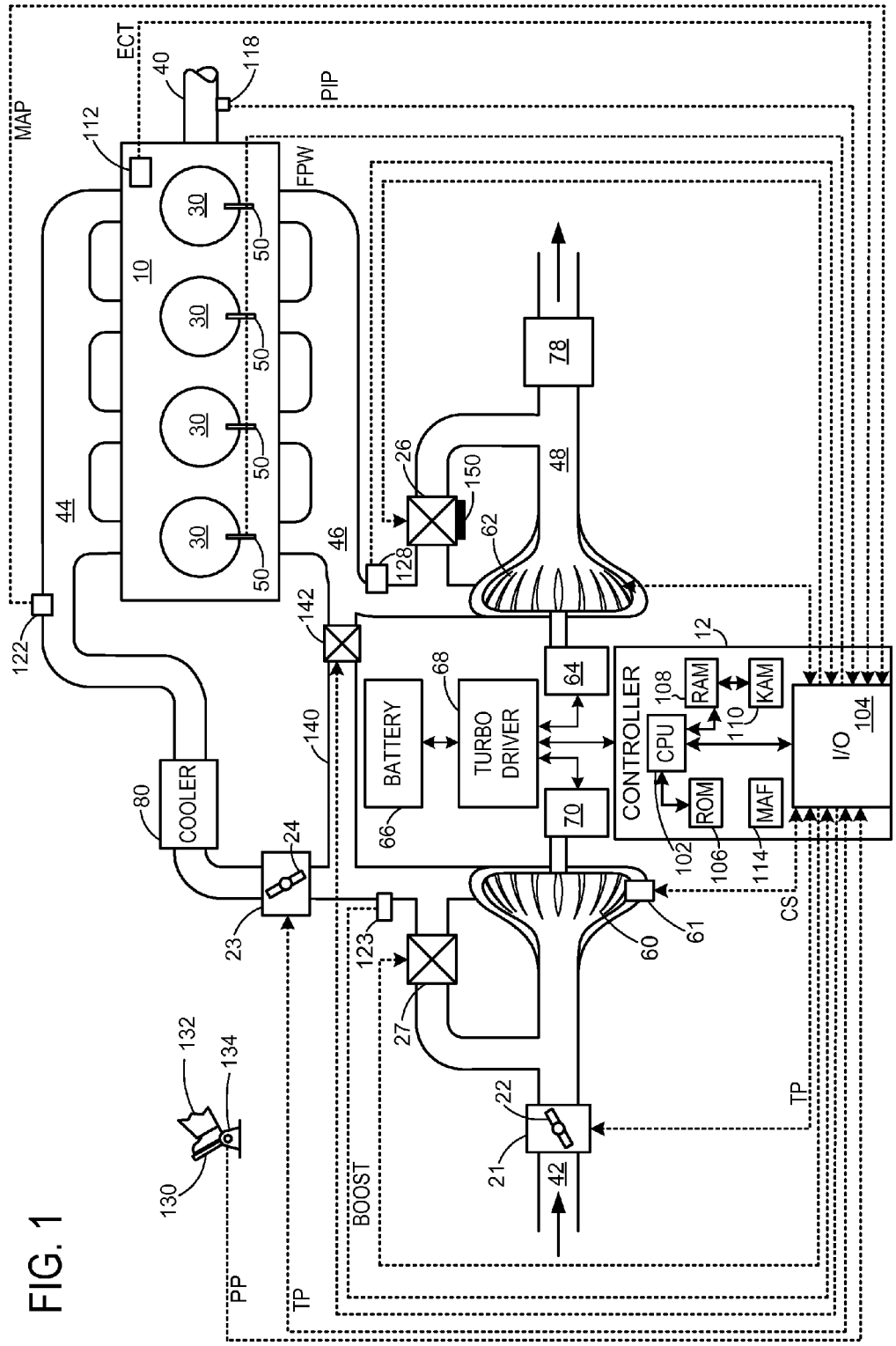
FIG. 1 is a schematic diagram showing an example engine including a mass air flow sensor.
Figure 2:
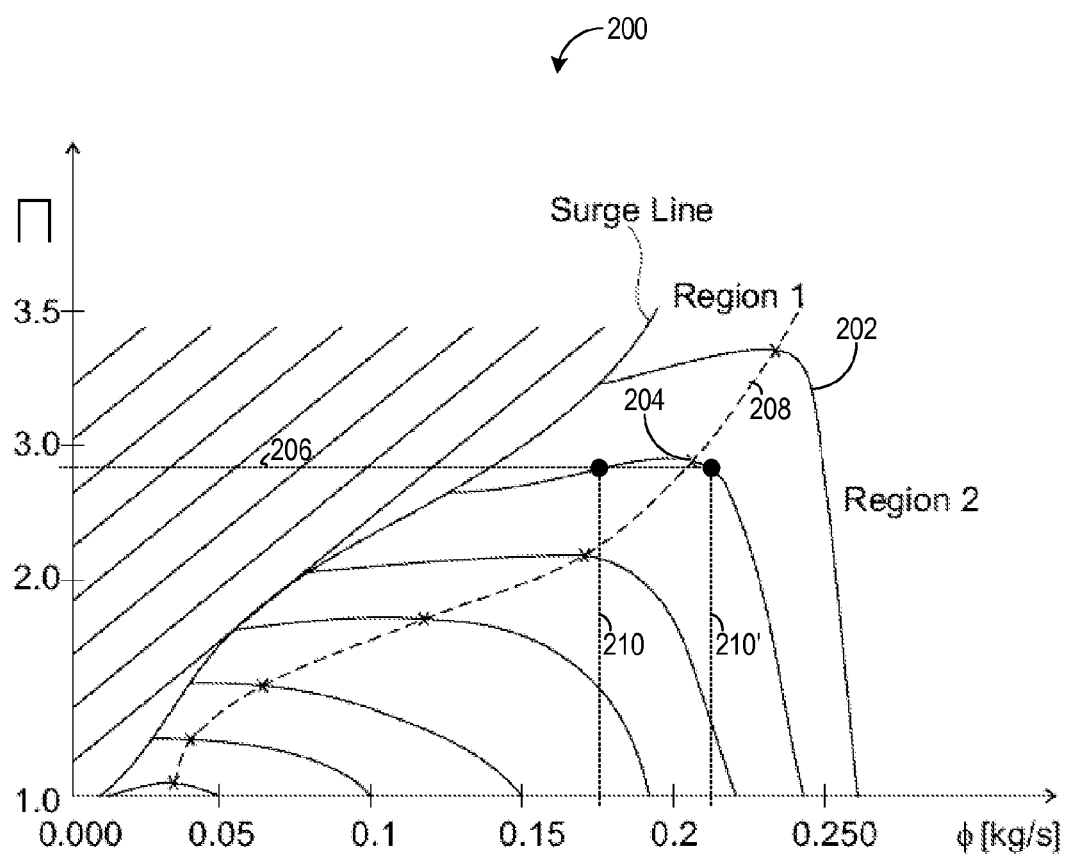
FIG. 2 shows an example compressor map.
Figure 3:
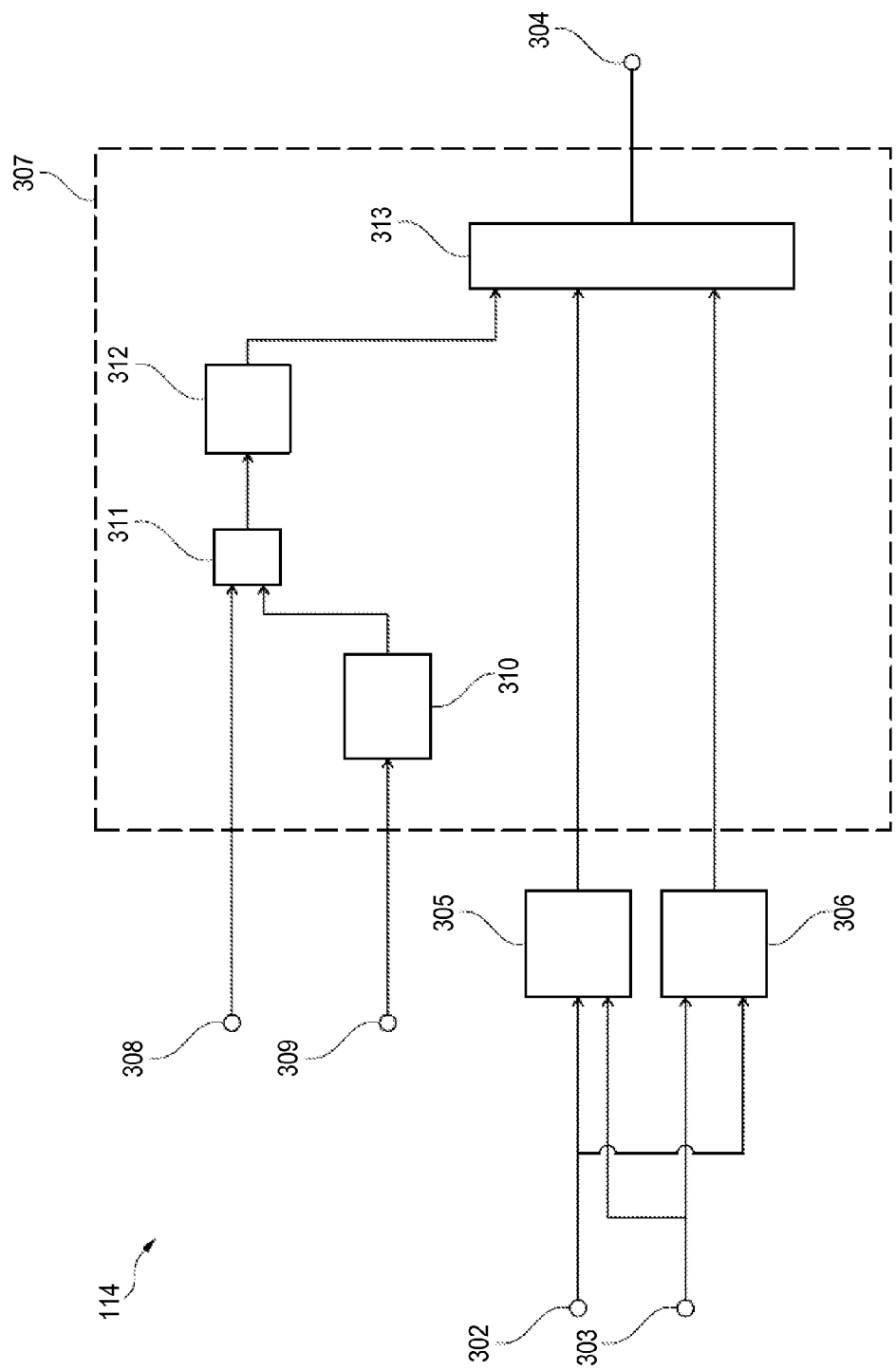
FIG. 3 shows the mass air flow sensor of FIG. 1 in schematic form.
Figure 4:
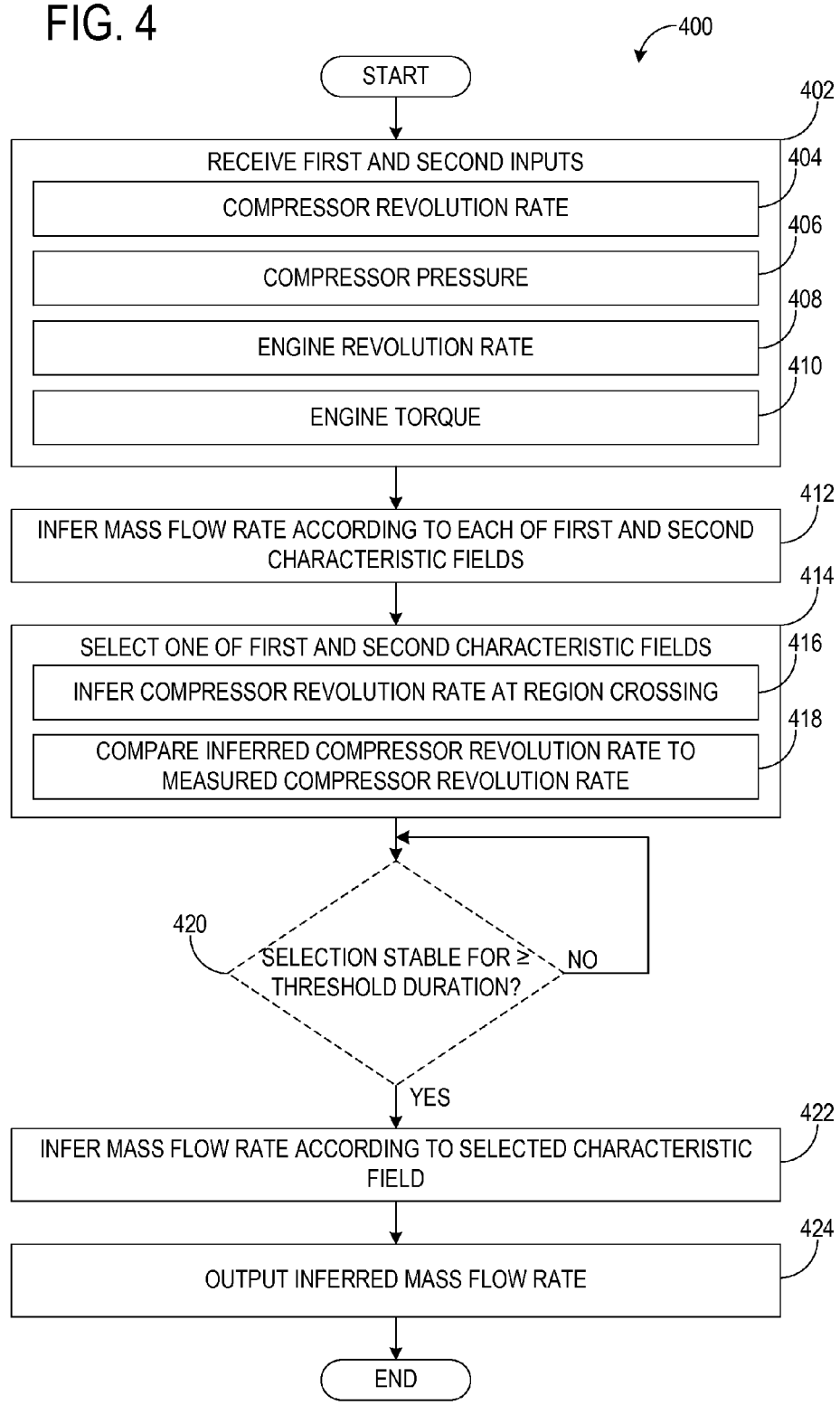
FIG. 4 shows a flowchart illustrating a method of inferring mass flow rate.
Figure 5:
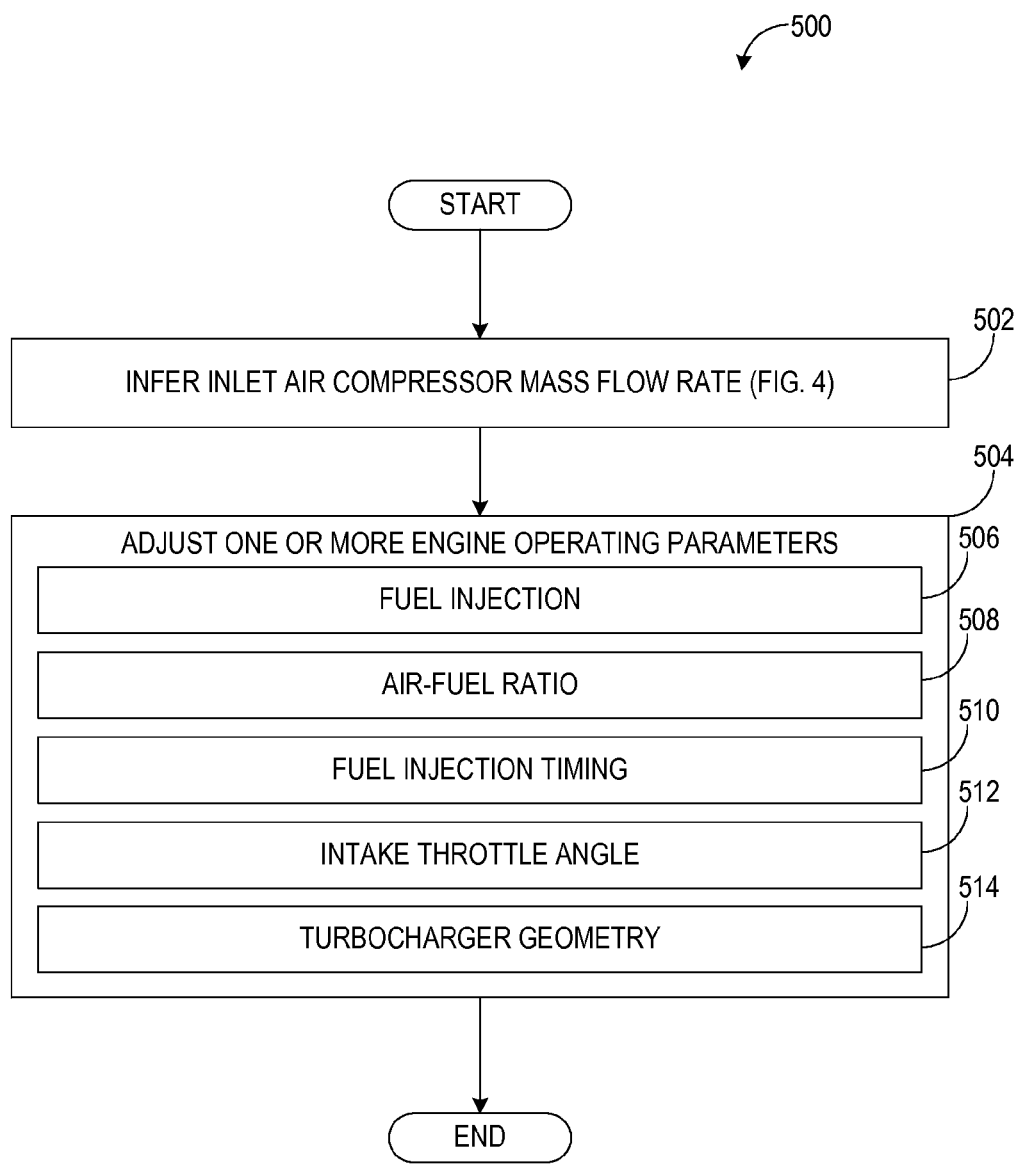
FIG. 5 shows a flowchart illustrating a method of controlling engine operation based on an inferred mass flow rate.

Various systems and methods are provided for inferring mass flow rate. In one example, a mass flow rate sensor configured to determine a mass flow rate of an inlet air compressor of an internal combustion engine, the mass flow rate sensor comprises a first signal input for a revolution rate signal of the inlet air compressor, a second signal input for an output pressure signal of the inlet air compressor, an output for a mass flow rate signal, a first characteristic field, a second characteristic field, each of the first and second characteristic fields associating a mass flow rate value with a pair of values of a revolution rate value and an output pressure value respectively received via the first and the second signal inputs, and a selection unit that comprises a first parameter input and a second parameter input, the selection unit configured to produce a selection signal depending on a pair of parameters respectively received via the first and second parameter inputs and to switch the mass flow rate value of either the first or the second characteristic field through to the output of the mass flow rate sensor depending on the selection signal. FIG. 1 is a schematic diagram showing an example engine including a mass air flow sensor, FIG. 2 shows an example compressor map, FIG. 3 shows the mass air flow sensor of FIG. 1 in schematic form, FIG. 4 shows a flowchart illustrating a method of inferring mass flow rate, and FIG. 5 shows a flowchart illustrating a method of controlling engine operation based on an inferred mass flow rate. The engine of FIG. 1 also includes a controller configured to carry out the methods depicted in FIGS. 4 and 5.

FIG. 1 is a schematic diagram showing an example engine 10, which may be included in a propulsion system of an automobile or motor vehicle. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a manifold air pressure sensor 122 and a throttle inlet pressure sensor 123 for providing respective signals MAP (manifold air pressure) and BOOST to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, AFR, spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; absolute manifold pressure signal, MAP, from sensor 122, as discussed; and boost pressure signal from sensor 123, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used without departing from the scope of this disclosure. During stoichiometric operation, the MAP sensor can give an indication of engine torque. Alternatively or additionally (e.g., during periods of non-stoichiometric operation), engine torque may be inferred at least based on the amount (e.g., mass) of fuel injected. Further, the MAP sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. FIG. 1 shows the inclusion of a compressor speed sensor 61 configured to sense the rotational speed of compressor 60. Compressor speed sensor 61 is communicatively coupled to controller 12 so that the controller may receive a compressor speed (CS) signal, which as described in further detail below, may be utilized to implement a mass air flow (MAF) sensor. Alternatively or additionally, compressor speed may be inferred based on one or more engine and/or turbocharger operating conditions. Implementation of the MAF sensor may further include assessing at least one pressure value associated with compressor 60—for example, an absolute outlet pressure downstream of the outlet of the compressor may be sensed. This absolute outlet pressure may be sensed via sensor 123 or a dedicated compressor outlet pressure sensor not shown in FIG. 1, for example. In other implementations, a pressure ratio across compressor 60 may be sensed, where the ratio may be determined by sensing the inlet pressure upstream of the compressor inlet (e.g., compressor input pressure) and the outlet pressure downstream of the compressor outlet (e.g., compressor output pressure). In this case, a differential pressure sensor configured to sense both the inlet and outlet pressures may be used.

For a turbocharger, compressor 60 may be at least partially driven by a turbine 62, via, for example a shaft, or other coupling arrangement. The turbine 62 may be arranged along exhaust passage 48 and communicate with exhaust gases flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, sensor 123 may be disposed in intake manifold 44 for providing the BOOST signal to controller 12.

Exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on MAF inferred as described herein and signals from the MAP (intake manifold), MAT (manifold gas temperature) and the crank speed sensors. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

As alluded to above, sensing of one or more signals described herein may be used to implement a mass air flow (MAF) sensor. FIG. 1 shows the inclusion of a MAF sensor 114 implemented on controller 12. In this example, MAF sensor 114 is not a physical sensor dedicated to sensing MAF (e.g., does not physically sample charge air to produce a transduced MAF signal), but rather infers MAF based on readings from one or more other sensors. MAF sensor 114 may be configured to infer MAF at various locations and/or the MAF associated with one or more components illustrated in FIG. 1—for example, the MAF sensor may be configured to infer the MAF associated with compressor 60 (e.g., the mass air flow of outlet gases existing the compressor). MAF sensor 114 may be implemented in hardware, software, or a combination thereof, using one or more of the components of controller 12 (e.g., CPU 102, I/O 104, ROM 106, the data bus, etc.). It will be appreciated, however, that MAF sensor 114 may alternatively or additionally be implemented on a separate controller communicatively coupled to controller 12, or may be implemented in various other suitable manners.

As described in further detail below with reference to FIG. 3, MAF sensor 114 may determine the MAF of outlet gases exiting compressor 60 based at least on the revolution rate (e.g., rotational speed) of the compressor and the output pressure of the compressor (e.g., the pressure of outlet gases exiting the compressor). In some scenarios, however, it may not be possible to definitively associate a MAF value with a given compressor output pressure—that is, in some compressors two different output pressures may be associated with the same MAF. FIG. 2 illustrates this potential issue, showing an example compressor map 200. Map 200 plots, on the y-axis, pressure ratios for an example compressor such as compressor 60 of FIG. 1, where the pressure ratios are determined as the ratio of the compressor output pressure to the compressor input pressure. On the x-axis is plotted MAF (e.g., mass air flow rate) in units of kg/s. Map 200 further plots a family of (e.g., constant) compressor revolution rate curves such as curve 202.

Above a line denoted in FIG. 2 as "Surge Line", there is a so-called unstable zone (illustrated via hatching in FIG. 2), in which operation of the inlet air compressor becomes unstable due to compressor stalling on the impeller. In the stable region, each revolution rate curve has a maximum pressure ratio (e.g., maximum ratio 204), which has an associated MAF. For at least some of the maximum pressure ratios of each revolution rate curve there are relatively lower pressure ratios of the same value on both sides of the maximum. As a result, a certain pressure ratio can be associated with two different mass flow rates. For example, for the curve having maximum ratio 204, a pressure ratio 206 can be associated with either mass flow rate 210 or mass flow rate 210'.

The issue identified above may be addressed by deriving two characteristic fields from the characteristic field shown in FIG. 2, each of which enables a definite association of mass flow rates with output pressures. For this purpose each curve of the family of curves of FIG. 2 is divided into two parts along a line 208 passing through the maxima of the individual curves, each part then forming one of the two characteristic fields. An associated mass flow rate value can be determined from each of the characteristic fields using an output pressure value. To definitively infer mass flow rate based on output pressure, which of the two mass flow rate values, and which characteristic field is relevant in a given situation, is determined. For this purpose, MAF sensor 114 (FIG. 1) comprises a selection unit that carries out such selection using two parameters and switches the correct mass flow rate value through to the output of the sensor. As described in further detail below, various suitable parameters may be used for the selection. In one example, the parameters used for the selection include a revolution rate (e.g., rotational speed) an associated internal combustion engine and a current torque of the internal combustion engine. In this case the first parameter input of the selection unit is connected to a revolution rate signal of the internal combustion engine (e.g., may be communicatively coupled to an engine revolution rate sensor) and the second parameter input of the selection unit is connected to a torque signal of the internal combustion engine. The revolution rate of the internal combustion engine and the torque of the internal combustion engine can be used in order to determine on which side of line 208 the internal combustion engine and hence the inlet air compressor are currently being operated. Thus in this example the characteristic field for region 2 can be used for a relatively high range of revolution rates and a relatively high range of torques, whereas the characteristic field of region 1 can be used for a relatively low range of revolution rates and a relatively low range of torques.

Alternatively it is however also possible to determine the characteristic field to be used using the revolution rate of the inlet air compressor and the output pressure value of the compressor. In this case MAF sensor 114 (FIG. 1) can determine the mass flow rate using only said two parameters. The first and the second parameter inputs of the selection unit are connected to the first and second signal inputs of the MAF sensor for this purpose. The characteristic field to be used can e.g., be determined by checking the revolution rate of the compressor at which a change occurs between regions 1 and 2 (e.g., from 1 to 2 or from 2 to 1) for a relevant output pressure value. In this example, a point on line 208 associated with a certain output pressure value is sought and the revolution rate value associated with said point is then determined directly. The corresponding revolution rate value obtained in this way is then compared with the actual revolution rate value of the inlet air compressor (e.g., the sensed revolution rate), whereafter it can be determined whether the characteristic field for region 1 or for region 2 is to be used depending on the comparison result. The association of the corresponding revolution rate value with a respective output pressure value can be carried out using another characteristic field. For this purpose the selection unit can comprise a third characteristic field that assigns an appropriate revolution rate value to a received output pressure value. The selection unit is designed to produce the selection signal depending on the result of a comparison of the revolution rate value with the corresponding revolution rate value.

Turning now to FIG. 3, MAF sensor 114 of FIG. 1 is shown in schematic form. With reference to FIG. 1, MAF sensor 114 comprises a first signal input 302 by means of which the MAF sensor may receive a revolution rate signal (e.g., from compressor speed sensor 61) of the inlet air compressor (e.g., of its impeller), a second signal input 303, by means of which an output pressure signal of the compressor (e.g., sensed via sensor 123, a dedicated output pressure sensor, a differential pressure sensor) is fed to the MAF sensor, and an output 304 for an inferred mass flow rate signal. With reference to FIG. 1, the output 304 may be made available to controller 12 so that operation of engine 10 and/or compressor 60 may be adapted to the inferred mass flow rate, for example. Furthermore, MAF sensor 114 comprises a first characteristic field 305 and a second characteristic field 306, each of which associates a mass flow rate value with a pair of values: a revolution rate value and an output pressure value received by means of the first and the second signal inputs 302 and 303. Moreover, MAF sensor 114 comprises a selection unit 307 that comprises a first parameter input 308 and a second parameter input 309, and is configured to produce a selection signal depending on a pair of parameters received by means of a first and a second parameter input 308 and 309 and to switch the mass flow rate value of either the first or of the second characteristic field 305 and 306 through to the output 304 of the MAF sensor depending on the selection signal.

In the embodiment depicted in FIG. 3, the selection unit 307 comprises a multiplexer 313, which depending on the selection signal connects one of the outputs of the characteristic fields 305 or 306 to the output 304 of MAF sensor 114 and disconnects the unselected output therefrom. Multiplexer 313 may thus selectively route a selected inferred compressor mass flow rate to output 304 depending on the results obtained by a comparator 311 described below. It will be appreciated, however, that other suitable mechanisms may be employed for signal selection without departing from the scope of this disclosure.

The selection unit 307 may include a third characteristic field 310 that associates an appropriate output value with a parameter value received by means of the parameter input 309. The third characteristic field 310 can optionally also be connected to the other parameter input 308 and can carry out the association depending on the pair of parameters received by means of the two parameter inputs 308 and 309.

For example, an output pressure or an output pressure ratio of inlet air compressor 60 (FIG. 1) can be received by means of the parameter input 309 and a revolution rate of the inlet air compressor can be received by means of the parameter input 308. In this case the third characteristic field 310 assigns an appropriate revolution rate of the inlet air compressor to the input value received by means of the parameter input 309. The appropriate revolution rate can be the revolution rate at which a transition between regions 1 and 2 (FIG. 2) occurs for said output pressure or said output pressure ratio. Said revolution rate can then be compared in a comparator 311 with the actual revolution rate (e.g., compressor revolution rate sensed by compressor speed sensor 61 of FIG. 1) of the inlet air compressor received by means of the parameter input 308. The result of said comparison, as the selection signal, indicates which characteristic field 305 or 306 is to be used in the given situation—that is, whether the value to be output by means of the output 304 of MAF sensor 114 is to be taken from the first or the second characteristic fields 305 or 306.

Said selection can also be made in a similar or same manner depending on parameters other than the revolution rate and the output pressure of inlet air compressor 60 (FIG. 1). Thus, e.g., the revolution rate of internal combustion engine 10 (FIG. 1) that is equipped with the inlet air compressor, and the torque of the internal combustion engine, can be used as parameters for the selection in order to select one of the two characteristic fields 305 or 306. As described above, the revolution rate of the engine may be determined based on output from sensor 118 (FIG. 1), while the engine torque may be determined based on output from MAP sensor 122 (FIG. 1) during stoichiometric engine operation and/or inferred from the amount of fuel injected into the engine.

MAF sensor 114 may optionally include an inertial element 312 that debounces a selection signal produced by the comparator 311 or otherwise by the selection unit 307 before it is used for the selection of the characteristic field 305 or 306 that is to be used. The inertial element 312 can, e.g., comprise an input for the selection signal and an output for a debounced selection signal and can be configured to switch a signal change at its input through to its output only if the selection signal applied to the input has been stable for at least a predetermined period of time. The inertial element 312 carries out filtering of the selection signal and thus may mitigate or prevent an excessively rapid changeover between the two characteristic fields of the MAF sensor. The stability of the device and of regulating systems that use the mass flow rate value determined in this way as an input variable can be increased by avoiding such an excessively rapid changeover.

The first, second, and third characteristic fields 305, 306, and 310 can be implemented in various suitable manners—e.g., as lookup tables or the characteristic fields can include lookup tables. Alternatively or additionally, interpolation may be employed for one or more of the characteristic fields to determine accurate result values for values between stored data points. In one example, one or more of the first, second, and third characteristic fields may include a plurality of monotonically decreasing or monotonically increasing characteristics (e.g., functions, curves), which may simplify determination of mass flow rates.

MAF sensor 114 may facilitate accurate determination of mass flow rates such as those of outlet gases exiting compressor 60 (FIG. 1) without the use of a physical sensor dedicated to MAF sensing, which may reduce cost, packing space, and control complexity, and afford MAF sensing for conditions in which operation of a physical MAF sensor may become degraded. Moreover, in some scenarios, MAF sensor 114 may not stipulate the inclusion of new or additional sensing hardware, as the physical sensors (e.g., sensors 61, 118, 123, all of FIG. 1) that are used to implement the MAF sensor are already employed in an engine; the output afforded by such sensors is desired for reasons other than determining MAF.

FIG. 4 shows a flowchart illustrating a method 400 of inferring mass flow rate. With reference to FIG. 1, method 400 may be implemented, for example, on controller 12 via MAF sensor 114. In some examples, method 400 may be employed to infer the mass flow rate of outlet gases exiting an inlet air compressor such as compressor 60 of FIG. 1.

At 402 of method 400, first and second inputs are received. The inferred mass flow rate may be based, at least in part, on the first and second inputs. Receiving the first and second inputs may include, at 404, receiving a revolution rate of the compressor (e.g., via sensor 61 of FIG. 1), at 406, receiving a pressure associated with the compressor (e.g., an absolute output pressure of the compressor sensed by sensor 123 of FIG. 1, a pressure ratio of the output to the input compressor pressure), at 408, a revolution rate of an associated engine (e.g., the revolution rate of engine 10 of FIG. 1 sensed via sensor 118), and at 410, a torque of the engine. Thus, the first and second inputs may both either be indicative of operation of the compressor or the engine.

At 412 of method 400, a mass flow rate is inferred according to each of first and second characteristic fields. Put another way, respective mass flow rates are inferred for each of the first and second characteristic fields. As described above, the first and second characteristic fields associate input (compressor pressure, compressor revolution rate, etc.) with output (mass flow rate), and may be implemented in various suitable manners such as lookup tables. The characteristic fields may be derived from a compressor map such as map 200 of FIG. 2, and may each produce a different mass flow rate. As such, one of the two mass flow rates inferred from the first and second characteristic fields may be selected.

At 414 of method 400, one of the first and second characteristic fields is selected. Selection of one of the first and second characteristic fields may include, at 416, inferring a compressor revolution rate at a location where a transition between regions occurred in a compressor map—e.g., where a transition at a region crossing across line 208 of compressor map 200 of FIG. 2 occurred, such as a location corresponding to maximum ratio 204. The inferred compressor revolution rate may be determined via a third characteristic field (e.g., a lookup table) that provides compressor revolution rates for a given input (e.g., compressor pressure, engine torque). Selection of one of the first and second characteristic fields may include, at 418, comparing the inferred compressor revolution rate inferred at 416 to a measured compressor revolution rate. The measured compressor revolution rate may be the compressor revolution rate received at 404, for example, and may be sensed via sensor 61 of FIG. 1. In one example, the comparison may determine whether the measured compressor revolution rate exceeds or falls below the inferred compressor revolution rate. If it is determined that the measured compressor revolution rate exceeds the inferred compressor revolution rate, the second characteristic field corresponding to region 2 of compressor map 200 (FIG. 2) may be selected. Conversely, if it is determined that the measured compressor revolution rate falls below the inferred compressor revolution rate, the first characteristic field corresponding to region 1 of compressor map 200 (FIG. 2) may be selected. If the measured compressor revolution rate is determined to be equal to the inferred compressor revolution rate, various actions may be performed such as delaying characteristic field selection until the measured and inferred compressor revolution rates become unequal, for example.

At 420 of method 400, it is optionally determined whether the selection performed at 414 has been stable for at least a threshold duration. Here, the selection may be filtered, mitigating or preventing an excessively rapid changeover between the two characteristic fields. In one example, the selection may be considered stable if it retains a given value (e.g., first or second characteristic field) for at least the threshold duration. The threshold duration may be predetermined, for example. If it is determined that the selection has not been stable for at least the threshold duration (NO), method 400 returns to 420, such that subsequent mass flow rate inference is not performed until the selection becomes stable. If it is determined that the selection has been stable for at least the threshold duration (YES), method 400 proceeds to 422.

At 422 of method 400, the mass flow rate is inferred according to the selected characteristic field. In this way, an accurate mass flow rate may be inferred without confounding two different mass flow rates that might otherwise be associated with the same compressor pressure.

At 424 of method 400, the inferred mass flow rate (e.g., from the selected characteristic field) is outputted. Output of the inferred mass flow rate may provide an engine controller (e.g., controller 12 of FIG. 1) with the inferred mass flow rate such that engine and/or compressor operation may be adapted to the inferred mass flow rate.

It will be appreciated that various aspects of the approaches disclosed herein for inferring mass flow rate may be modified without departing from the scope of this disclosure. For example, the approaches for inferring mass flow rate described herein may be employed for inferring the mass flow rate of fresh intake air, EGR gasses, other fluids, a combination thereof, etc.

FIG. 5 shows a flowchart illustrating a method 500 of controlling engine operation based on an inferred inlet air compressor mass flow rate. Method 500 may be implemented on controller 12 of FIG. 1, for example, and used to control aspects of the operation of engine 10 based on an inferred mass flow rate of compressor 60.

At 502 of method 500, an inlet air compressor mass flow rate is inferred according to method 400 of FIG. 4.

At 504 of method 500, one or more engine operating parameters are adjusted. The one or more engine operating parameters may include fuel injection (e.g., which may include pulse width modulation) 506, air-fuel ratio (AFR) 508, fuel injection timing (e.g., spark retard, spark advance) 510, intake throttle angle 512, and turbocharger geometry 514 for embodiments in which a variable geometry turbocharger is employed. It will be appreciated, however, that these engine operating parameters are provided as examples, and that virtually any adjustable engine operating parameter may be adjusted as part of method 500. It will be further appreciated that modification of one or more engine operating parameters may or may not include adjusting one or more actuators and/or components—for example, adjustment of fuel injection and/or fuel injection timing may include adjusting electronic parameters (e.g., pulse width of FPW signal) in an engine controller (e.g., controller 12) alternatively or in addition to adjusting one or more actuators associated with fuel injectors and/or a fuel system, for example, which may in turn lead to the desired adjustments in fuel injection and/or fuel injection timing. As additional examples, adjustment of AFR may include adjusting electronic parameters (e.g., pulse width of FPW signal) in the engine controller alternatively or in addition to adjusting actuators associated with one or more intake valves (e.g., with reference to FIG. 1, adjusting one or more of the actuators respectively associated with throttles 21 and 23), which may lead to an adjustment in intake throttle angle, for example. Adjustment of turbocharger geometry may include adjusting an actuator configured to control the turbocharger geometry, for example. As yet another example, adjustment of EGR may include adjusting one or more electronic parameters (e.g., desired EGR rate, desired EGR dilution) in the engine controller alternatively or in addition to adjusting one or more actuators associated with the EGR system (e.g., adjusting an actuator operatively coupled to EGR valve 142 to thereby cause a change in the position of the EGR valve and thereby cause desired changes to the supply of EGR gasses to the engine intake system).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A mass flow rate sensor configured to determine a mass flow rate of an inlet air compressor of an internal combustion engine, the mass flow rate sensor comprising:
    a first signal input for a revolution rate signal of the inlet air compressor;
    a second signal input for an output pressure signal of the inlet air compressor;
    an output for a mass flow rate signal;
    a first characteristic field;
    a second characteristic field, each of the first and second characteristic fields associating a mass flow rate value with a pair of values of a revolution rate value and an output pressure value respectively received via the first and the second signal inputs; and
    a selection unit that comprises a first parameter input and a second parameter input, the selection unit configured to produce a selection signal depending on a pair of parameters respectively received via the first and second parameter inputs and to switch the mass flow rate value of either the first or the second characteristic field through to the output of the mass flow rate sensor depending on the selection signal, wherein the first parameter input of the selection unit is connected to a revolution rate signal of the internal combustion engine and wherein the second parameter input of the selection unit is connected to a torque signal of the internal combustion engine.

2. The mass flow rate sensor of claim 1, wherein the first and the second parameter inputs of the selection unit are respectively connected to the first and the second signal inputs of the mass flow rate sensor.

3. The mass flow rate sensor of claim 1, wherein the selection unit comprises a third characteristic field that assigns an appropriate revolution rate value to a received output pressure value, the selection unit configured to produce the selection signal depending on a result of a comparison of the revolution rate value with the appropriate revolution rate value.

4. The mass flow rate sensor of claim 1, wherein the selection unit comprises an inertial element that comprises an input for the selection signal and an output for a debounced selection signal, the inertial element configured to switch a signal change at the input through to the output if the selection signal applied to the input has been stable for at least a predetermined threshold time.

5. The mass flow rate sensor of claim 1, wherein the output pressure signal is a ratio of an output pressure at an output side of the inlet air compressor to an input pressure at an input side of the inlet air compressor.

6. The mass flow rate sensor of claim 1, wherein the output is used to adjust one or more operating parameters of the internal combustion engine.

7. The mass flow rate sensor of claim 6, wherein the internal combustion engine is positioned in a motor vehicle.

8. A method of operating an internal combustion engine, comprising:
receiving a first input and a second input both indicative of operation of an inlet air compressor or the internal combustion engine;
inferring respective inlet air compressor mass flow rates of a first characteristic field and a second characteristic field, the first and second characteristic fields being of a compressor map, where the first and second characteristic fields are two sections of a common compressor speed curve divided by a maximum pressure ratio of the curve;
selecting one of the inferred inlet air compressor mass flow rates based on a comparison of an inlet air compressor mass flow rate inferred at a region crossing in the compressor map to a sensed inlet air compressor mass flow rate; and
adjusting one or more operating parameters of the internal combustion engine based on the selected inferred inlet air compressor mass flow rate.

9. The method of claim 8, wherein the first input is a rotational speed of the inlet air compressor, and wherein the second input is an output pressure of the inlet air compressor.

10. The method of claim 8, wherein the first input is a revolution rate of the internal combustion engine, and wherein the second input is a torque of the internal combustion engine.

11. A mass air flow sensor for an inlet air compressor of a turbocharger, comprising:
a first input for receiving one of a compressor speed and an engine speed;
a second input for receiving one of a compressor output pressure and an engine torque;
a first characteristic field for inferring a first compressor mass flow rate based on the first and second inputs according to a first region of a compressor map;
a second characteristic field for inferring a second compressor mass flow rate based on the first and second inputs according to a second region of the compressor map;
a selection unit for selecting one of the first and second inferred compressor mass flow rates based on a comparison of a compressor mass flow rate inferred at a region crossing in the compressor map to a sensed compressor mass flow rate, the first region of the compressor map structured to infer compressor mass flow rates for relatively low engine speeds and loads, and wherein the second region of the compressor map is structured to infer compressor mass flow rates for relatively high engine speeds and loads.

12. The mass air flow sensor of claim 11, wherein the mass air flow sensor is implemented on an engine controller.

13. The mass air flow sensor of claim 11, wherein the sensed compressor mass flow rate is measured via a boost pressure sensor positioned in an intake passage of an engine.

14. The mass air flow sensor of claim 11, wherein the compressor mass flow rate inferred at the region crossing is inferred via a third characteristic field based on the compressor output pressure.

15. The mass air flow sensor of claim 11, wherein the selection unit includes a multiplexer for selectively routing the selected inferred compressor mass flow rate to an output based on the comparison.

* * * * *